United States Patent [19]

Babcock

[11] 4,366,209

[45] Dec. 28, 1982

[54] SURFACE TREATING METHOD AND COMPOSITION FOR CEMENT

[75] Inventor: Warner K. Babcock, Stamford, Conn.

[73] Assignee: Construction Products Research, Inc., Fairfield, Conn.

[21] Appl. No.: 272,775

[22] Filed: Jun. 11, 1981

[51] Int. Cl.$^3$ .............................................. B05D 5/00
[52] U.S. Cl. .................................... 428/446; 106/104; 427/180; 427/397.7; 427/201; 428/703
[58] Field of Search ...................... 427/180, 397.7, 201; 428/703, 312.4, 446; 106/104, 109, 110

[56] References Cited

U.S. PATENT DOCUMENTS

| | | | |
|---|---|---|---|
| 3,775,143 | 11/1973 | Mikhallou et al. | 106/89 |
| 3,861,929 | 1/1975 | Deets et al. | 106/89 |
| 3,922,172 | 11/1975 | Crinkelmeyer et al. | 106/104 |
| 4,010,232 | 3/1977 | Labrecque | 428/312.4 |
| 4,012,264 | 3/1977 | Murray et al. | 106/89 |
| 4,045,237 | 8/1977 | Gaines et al. | 106/89 |
| 4,094,692 | 6/1978 | Rauschenfels | 106/104 |
| 4,157,263 | 6/1979 | Gaines et al. | 106/89 |
| 4,216,022 | 8/1980 | Wilson | 106/104 |

Primary Examiner—Shrive P. Beck
Attorney, Agent, or Firm—Pennie & Edmonds

[57] ABSTRACT

A method of treating the unset surface of Portland cement concrete to form thereon a hardened surface, that is an integral coating, skin, treatment or mass of high early compressive strength, without substantial shrinkage during setting while exhibiting reduced wet and dry volume changes in the hardened state and prossessing a high degree of impermeability to fluids, abrasion, erosion and chemical resistance and similar characteristics desired in a surface treatment having commercial usefulness in a construction industry. The hardened surface is obtained by dry shaking, that is, sprinkling a dry cementitious composition of alumina cement and gypsum on the unset Portland cement concrete. Additional components, such as viscosity controllers, surface active agents, retarders, accelerators, wet expansion inhibitors, gas generating or gas releasing agents, fly ash, plasticizers, pigments, water retentivity aids, fillers, and aggregates may be utilized to adjust the properties of the composition and impart selective improvement of specific properties.

9 Claims, No Drawings

SURFACE TREATING METHOD AND COMPOSITION FOR CEMENT

BACKGROUND OF THE INVENTION

1. Field of the Invention

This invention relates to a method and composition for treating the surface of unset Portland cement. In particular, this invention relates to a method and composition for forming a hardened surface of high compressive strength and possessing a high degree of fluid impermeability while exhibiting an increase in surface hardness and abrasion resistance and early strength by dry shaking, that is, sprinkling, a mixture of aluminous cement and gypsum on the unset surface of Portland cement concrete. More specifically, the present invention relates to a surface treating method utilizing a dry cementitious composition containing aluminuous cement and gypsum sprinkled on unset Portland cement concrete. The composition may optionally contain additives.

The terms "cementitious compositions", or "cementitious systems" as used herein, are intended to mean compositions which generally possess the characteristic of hardening under water including cementitious waterproofings, toppings, protective coatings, and the like as well as mixtures with aggregates and water such as concrete, mortar, grout and products made therefrom.

The term "aluminous cement", as used herein, is intended to include those cementitious materials normally understood in the art to contain, as the main cementitious constitutent, mono-calcium aluminate ($CaO:Al_2O_3$), such as high alumina cement and calcium aluminate cement. Examples of commercially available aluminous cements suitable for use in the invention are Lumnite by Lehigh Portland Cement Company and the high alumina cement Fondu or Secar by Lonestar LaFarge Aluminous Cement Company, Ltd. Some commercially available aluminous cements may have had gypsum added to them, in preparation of the clinker before fixing. This is added solely as an aid to manufacturing and is belived to result in a $SO_3$ content in the cement equal to or less than 2.5 percent. Gypsum has been added, in small quantities, to aluminuous cements after firing as a set controller.

The term "gypsum", as used herein, is intended to include gypsum such as normally understood in the art, including calcium sulfate ($CaSO_4$) and its various forms, calcium sulfate anhydrate, calcium sulfate hemidydrate, calcium sulfate dihydrate as well as calcined gypsum, pressure calcined gypsum and plaster of Paris. Examples of commercially available gypsums suitable for use in the invention are the high pressure calcined gypsum sold under the tradename "Densite", "K-5" and "K-34", by Georgia Pacific Corporation or the tradename "Hydrostone" by United States Gypsum Company.

The term "Portland cement", as used herein, is intended to include those cements which have sufficient "Portland cement" in them for interaction with the surface treating compositions and includes those normally understood in the art to be "Portland cements" including, but not limited to, those described in the designation ASTM C 150 as well as Portland cement-based cementitious compositions such as expansive cements, pozzolanic cement, mixtures of Portland cement with other cements and blends of Portland cement. The term "concrete", as used herein, is intended to include a mixture of cement, aggregate and water. The term "unset", as used herein, is intended to mean any time before final set. Generally, in the field this means a time when one can get on the surface, that is, walk on the surface although it may still leave a footprint.

2. Description of the Prior Art

There have been various prior art attempts at providing cementitious surface treating compositions and systems meeting the needs of the construction industry, particularly in the protection and waterproofing of concrete surfaces. Such systems should desirably be non-flammable, easy and economical to apply, non-toxic and set within a relatively short period of time into a hard mass or coating with sufficient early strength, abrasion resistance, and corrosion resistance. They should also possess impermeability to fluids, particulary liquids. At the same time, such systems should not possess excessive volume changes under either wet or dry conditions. These types of cementitious systems must also possess positive rather than adverse interaction characteristics with wet unset concrete surfaces. For commercial use the treatment compositions must possess early as well as long term strength and practical field workability. They should be capable of withstanding freezing and thawing as well as the action of salts, solvents and other corrosive substances.

Although there are cementitious concrete surface treatments possessing one or more of the above desirable properties, prior art attempts directed to achieving all of the foregoing in one composition have had only limited success. Many compositions of blended cement demonstrate poor interaction with unset concrete and/or exhibit excessive expansion. Thus, prior art attempts at providing cementitious concrete surface treatment of commercial value in the construction industry have generally been specific or emphasized particular properties in disregard of, or in some instances, in detriment to other desired attributes.

Mixes of Portland cement and high alumina cement are known for their quick-setting nature and this property has been put to practical use on a wide scale. Thus, T. D. Robson, *High Alumina Cements and Concretes*, John Wiley & Sons, N.Y., 1962, p. 128, discloses that when Portland cement concrete is placed between tides and is subject to early wave action, high alumina cement may be sprinkled on the unset surface and the reaction between the cements quickly gives a hard skin which helps to prevent damage until the main body of the concrete has time to harden.

Prior art cementitious compositions have utilized combination of Portland cement, aluminous cements and gypsums for mixing with water to form masses providing various alleged advantages.

U.S. Pat. No. 3,861,929 discusses the inherent shrinkage characteristics of concretes made with conventional cements which result in cracks on hardening and drying. That patent discloses an expansive cement that, during and after setting and hardening, increases significantly in volume. The expansive cement disclosed comprises a mixture consisting essentially of Portland and calcium aluminate cements and a quantity of calcium sulfate which may be in the form of gypsum. U.S. Pat. No. 3,775,143 discloses a "stressing" cement which includes Portland cement and an expanding component consisting of calcium sulfate, calcium oxide and an aluminate containing material such as aluminous cement or high alkaline calcium hydroaluminate. The cement is said to exhibit waterproofness as well as benzine- and gasproofness.

Compositions containing high alumina cement and Portland cement for use as a quick setting mix have been known. For example, U.S. Pat. No. 4,012,264 states that it is known that very rapidly setting and hardening cement can be produced by mixing Portland cement and high alumina cement and/or by the use of various accelerators and discloses a calcium-aluminate and Portland cement composition including retarders and/or accelerators. High alumina cement has also been added to plaster of Paris or anhydrite plasters in order to give stronger molds or castings. T. D. Robson, High Alumina Cements and Concretes, John Wiley & Sons, N.Y., 1962, pp. 126-7, discloses that lithium salts have been suggested as accelerators for high alumina cement. However, it has been found that compositions containing alumina cement, gypsum and lithium salts as an accelerator, alone, exhibit excessive hardened drying shrinkage. In addition, compositions containing aluminous cement and gypsum alone exhibit excessive hardened wet expansion. Furthermore, addition of Portland cement to such compositions containing aluminous cement and gypsum results in greater hardened wet expansion.

Dry shaking of surface treating constituents on unset concrete has been carried out for years. Such constituents include inert components such as pigments and special aggregates to provide color, abrasion resistance and similar desired properties. In addition, surface treating compositions for dry shaking application have included various types of Portland cement which while not inert are nevertheless compatible with the surface to which they are applied. However, the art has not heretofore used surface treating constituents which would normally be expected to be incompatible with the unset cement surface and to exhibit unwanted volume changes resulting in surface cracking and unstable, self-deteriorating cement.

U.S. Pat. Nos. 4,045,237 and 4,157,263 disclose a cementitious composition possessing a high degree of impermeability to liquid and vapor and reduced long term shrinkage composed of a particulate mixture of Portland cement, a calcined gypsum and high alumina cement. Alternatively, the composition can be composed of a particulate mixture of a high alumina cement and pressure calcined gypsum.

Although not prior art, in my co-pending application Ser. No. 262,175 filed on May 11, 1981 for "Method and Composition For Controlling Volume Change In Fast Setting, Fluid Impermeable Cementitious Systems", I disclose a cementitious composition which, when mixed with water, is capable of setting rapidly into a hard mass of high compressive strength without substantial shrinkage during setting and with reduced wet and dry volume changes in the hardened state while nevertheless possessing a high degree of impermeability to fluids, and abrasion, erosion and chemical resistance and similar characteristics desired in a composition having commercial usefulness in the construction industry. The composition there disclosed comprises a mixture of aluminous cement, gypsum, a drying shrinkage inhibitor preferably Portland cement, and a wet expansion inhibitor, preferably a salt of lithium.

SUMMARY OF THE INVENTION

I have discovered that dry cementitious composition, when sprinkled on the unset surface of Portland cement concrete, is capable of setting into a hardened surface, that is an integral coating, skin, treatment or mass of high early compressive strength, without substantial shrinkage during setting while exhibiting reduced wet and dry volume changes in the hardened state and possessing a high degree of impermeability to fluids, abrasion, erosion and chemical resistance and similar characteristics desired in a surface treatment having commercial usefulness in a construction industry. This is achieved, according to my invention, through the provision of a surface treatment cementitious composition comprising a mixture of aluminous cement and gypsum, all in the dry state.

An object of my invention is the provision of a method for treating the surface of unset Portland cement by sprinkling with a dry cementitous composition containing aluminous cement and gypsum to form thereon a hardened surface.

Accelerators and retarders, as well as a wet expansion inhibitor such as a salt of lithium, can be used, however, the surface treating cementitious composition provides a hardened surface possessing satisfactory properties, as described above, with a mixture of aluminous cement and gypsum even without such additives.

Thus, a further object of my invention is the the provision of a dry cementitious composition which, when applied to the surface of unset Portland cement, sets in a relatively short period of time to hard surface without excessive wet or dry hardened volume changes.

It is preferred to employ between 50 and 90 percent, by weight, aluminous cement and between 10 and 50 percent by weight, gypsum. In addition to the aforementioned essential constituents of the surface treating cementitious composition of my invention, additional components, such as viscosity controllers, surface active agents, retarders, accelerators, gas generating or gas releasing agents, fly ash, plasticizers, pigments, water retentivity aids, fillers, and aggregates may be utilized to adjust the properties of the composition and impart selective improvement of specific properties.

The results obtained according to my invention are both surprising and unexpected. One would normally expect that a combination of high alumina cement and gypsum sprinkled on a Portland cement surface would result in a non-uniform surface because combinations of the high alumina cement and Portland cement, when prepared as a cementitious mass, exhibit dimensional changes such as wet shrinkage. Similarly, addition of gypsum to such systems produces wet expansion. Thus, at best one would expect unpredictable volume changes. Also, dry shaking or sprinkling cementitious material on to a surface would be expected, based on experience, to produce surface crazing or perhaps even an adverse reaction.

Thus, a further object of my invention is the provision of a method and composition involving sprinkling, on unset Portland cement surfaces, of a composition containing aluminous cement and gypsum which will react with the unhydrated Portland cement and produce a hard skin surface and mass within a relatively short period of time of high compressive strength, high abrasion resistance and high erosion resistance without substantial shrinkage during setting and without excessive wet or dry hardened volume changes while possessing a high degree of impermeability to fluids and resistance to corrosive substances.

The foregoing and other objects, features and advantages of my invention will be further apparent from the following detailed description thereof and the accompanying claims.

DESCRIPTION OF THE PREFERRED EMBODIMENTS

The invention is best illustrated by the following examples and the results therefrom set forth in the tables below. In the examples, the surface treating constituents were blended in the dry powder state, with the aluminous cement-gypsum component being mixed with fine aggregate, that is, sand, in a weight ratio of 1:1 and then dry shaked, that is, sprinkled uniformly, at varying application rates as described herein, over fresh, unset Portland cement concrete and power troweled into the surface to yield a uniform, tight surface and allowed to set. The surface treating cementitious composition was sprinkled onto four different Portland cement concrete section specimens having the following dimensions:

| SPECIMEN | DIMENSION (inches) |
|---|---|
| A | 20 × 6 × 2 |
| B | 72 × 72 × 6 |
| C | 12 (diameter) × 1 |
| D | 720 × 120 × 8 |

All concrete sections were made with Type I Portland cement with mixtures in the range of 16 to 20 percent cement, 40 to 46 percent gravel and 36 to 40 percent sand. Water was used in the range of 45 to 50 percent, by weight, based on the cement.

For concrete specimens A and B, the relative permeability of different types of surface treatment was determined by placing a three inch diameter long stemmed polyethylene funnel upside down, directly over the testing surface approximately 24 hours following the treatment. The inverted funnel was sealed and glued over each test surface area with a silicone caulking glue. A calibrated 10 cc glass pipette with 0.1 cc increment graduations was affixed and sealed to the top portion of the stem of the funnel using a short piece of flexible hose. The funnel, hose and pipette were then filled with water thereby exposing a three inch diameter area of the test surface to water. The water level in the pipette was filled to the 0 graduation level creating an approximate 18 inch head of hydrostatic pressure on the test area. Utilizing the volume graduations on the pipette and noting the time intervals between readings, the relative flow rate, and consequently the permeability, could be determined between the various surface treatments.

EXAMPLE 1

A relative permeability determination was made on Portland cement concrete Specimen A without any surface treatment and the flow rate determined to be $2.9 \times 10^{-4}$ cc/second.

EXAMPLE 2

A surface treatment cementitious composition comprising 80 percent, by weight aluminous cement "Lumnite" and 20 percent, by weight, gypsum "Densite K-34" was applied to the unset surface of Portland cement concrete Specimen A, as described above, using application rates of ¾ lb. per square foot and one lb. per square foot. The relative permeability was determined, for the respective application rates, to be $1.8 \times 10^{-4}$ cc/second and $7.3 \times 10^{-5}$ cc/second, respectively.

EXAMPLE 3

A surface treating cementitious composition comprising 80 percent, by weight, aluminous cement, "Lumnite", 20 percent, by weight, gypsum, "Densite K-5" and 0.2 percent, by weight, based on the aluminous cement and gypsum, wet expansion inhibitor lithium carbonate was sprinkled on the fresh unset surface of Portland cement concrete Specimen A. At the application rate of ½ lb. per square foot the relative permeability was determined to be $2.0 \times 10^{-4}$ cc/second.

EXAMPLE 4

As a comparison with the examples above, dry Portland cement only was sprinkled on the unset surface of Portland cement concrete Specimen A at the rate of 1 lb. per square foot. It was not possible to make a proper relative permeability determination since there was extensive crazing, that is, surface cracking, apparent.

EXAMPLE 5

A relative permeability determination was made on Portland cement concrete Specimen B without any surface treatment and the flow rate determined to be $7.7 \times 10^{-5}$ cc/second.

EXAMPLE 6

The surface treatment cementitious composition of Example 3 was sprinkled uniformly over the fresh, unset surface of Portland cement concrete Specimen B at an application rate of ½ lb. per square foot and the relative permeability determined to be $3.8 \times 10^{-5}$ cc/second.

The results of the foregoing examples 1 through 6 are shown in Table 1 below.

TABLE 1

| Ex. | Specimen | Surface Treatment | Application lbs/ft$^2$ | Flow Rate cc/sec |
|---|---|---|---|---|
| 1 | A | None (control) | — | $2.9 \times 10^{-4}$ |
| 2 | A | aluminous cement and gypsum | ¾ 1 | $1.8 \times 10^{-4}$ $7.5 \times 10^{-5}$ |
| 3 | A | aluminous cement and gypsum and lithium salt | ½ | $2.0 \times 10^{-4}$ |
| 4 | A | Portland cement | 1 | surface crazing |
| 5 | B | None | — | $7.7 \times 10^{-5}$ |
| 6 | B | aluminous cement and gypsum and lithium salt | ½ | $3.8 \times 10^{-5}$ |

From the results of Examples 1 through 6 set forth in the above table, it can be seen that by sprinkling the dry blended consitituents of aluminous cement and gypsum or aluminous cement, gypsum and a wet expansion inhibitor on the unset Portland cement concrete waterproofing properties are imparted to the concrete substrate. Moreover, no surface crazing or evidence of excessive surface volume changes were observed, indicating that no noticeable expansive reaction between the aluminous cement, gypsum and the fresh Portland cement occurred.

The results of Examples 3 and 6 further confirm the surprising results obtained by sprinkling the dry blended constituents of aluminous cement and gypsum alone on the unset Portland cement concrete since the addition of the wet expansion inhibitor did not provide any appreciable benefit of a type suggesting that its addition is required to control volume changes. The wet expansion inhibitor which normally increases drying shrinkage did not detract from the waterproofing properties and imparts abrasion resistance advantages. Moreover, it is not necessary since no excessive surface volume changes were observed without it.

EXAMPLE 7

In this example a negative side waterproofing test was conducted on Portland cement concrete Specimen C. The surface treating cementitious composition of Example 3 above was sprinkled on the unset surface of Specimen B at an application rate of ½ lb. per square foot and allowed to cure for seven days. After seven days, two holes were drilled through the back of the concrete specimen and to within ¼±⅛ inch of the treated surface. Flexible tubing was glued and sealed into the holes. The tubing was filled with water and pressurized to 23 psi. The surface was observed for evidence of any moisture penetration. After seven days the surface remained dry.

EXAMPLE 8

As a comparison to the results observed in Example 7 using the composition and method of this invention, a Portland cement based capillary crystalline type "waterproofing" composition, was applied at the recommended rate of ⅓ lb. per square foot to the unset surface of Specimen C, permitted to age seven days and the negative side permeability test repeated as in Example 7. The treated surface was wet indicating the presence of leaks.

EXAMPLE 9

The treated and untreated surfaces of the foregoing examples 1 through 8 had applied to them a diluted solution of hydrochloric acid and the surfaces observed. It was found that only the surfaces treated with the composition of this invention were not readily attacked by the acid. The other surfaces were attacked by the acid. In addition, the aluminous cement, gypsum and wet expansion inhibitor treated surfaces, according to the surface treatment cementitious composition of Example 3, were harder or more abrasion resistant than all others therefore showing additional favorable properties.

EXAMPLE 10

To determine actual field workability and practicability, a larger slab specimen D was prepared using a Portland cement mix as previously described but further containing 0.5 percent, by weight, based on the total mix, calcium chloride. Four hours after placement, just prior to setting, a surface treatment cementitious composition comprising 80 percent, by weight, aluminous cement and 20 percent, by weight, gypsum was dry shaked on the unset concrete surface at a rate of ¾ to 1 lb. per square foot and immediately power trowled onto the surface leaving a smooth even treated surface. The surface set in less than one hour. The following day the treated surface was very hard with no observable cracking or surface problems.

The above examples demonstrate that the surface treatment cementitious composition comprising aluminous cement and gypsum alone can be applied directly to unset Portland cement concrete as an integral surface treatment to form an integral coating and improve the fluid impermeability, that is, waterproofing effectiveness, and corrosion resistance. With the presence of the wet expansion inhibitor, the abrasion resistance and erosion resistance of Portland cement concrete is further improved.

Those skilled in the art will appreciate that the relative respective amounts of aluminous cement and gypsum may be varied provided that the desired results described above are obtained. Thus, while it is preferred to employ between 50 to 90 percent, by weight, aluminous cement and between 10 and 50 percent, by weight, gypsum an effective amount of gypsum may, under certain conditions, be far less than 10 percent. The minimum effective amount can be readily ascertained in each instance by making the above described observations of fluid permeability and surface condition to determine the existence of an improvement over no treatment.

Those skilled in the art will also recognize that the application rate of the cementitious surface treatment composition to the concrete may vary with the maximum rate depending upon the free water present. The rate should be such as to provide the fluid impermeability desired and will generally range from ½ to 1 lb. per square foot. The material is applied to "dry shaking" as that term is used in the art, and power troweled into the unset concrete surface.

Thus, there has been disclosed a surface treating method and composition for Portland cement concrete which produces a hardened surface having properties and advantages not previously obtainable.

I claim:

1. A method for producing a hardened, fluid impermeable surface on Portland cement comprising selecting a treating composition comprising aluminous cement and gypsum, applying the treating composition in the dry state to the surface of unset Portland cement and allowing the Portland cement and treating composition to set.

2. A method for producing a hardened, fluid impermeable surface on Portland cement as claimed in claim 1 wherein the aluminous cement is present in an amount ranging from 50 to 90 percent, by weight, based on the total weight of aluminous cement and gypsum.

3. A method for producing a hardened, fluid impermeable surface on Portland cement as claimed in claim 1 wherein the gypsum is present in an amount ranging from 10 to 50 percent, by weight, based on the total weight of aluminous cement and gypsum.

4. A method for producing a hardened, fluid impermeable surface on Portland cement as claimed in claim 1 further exhibiting improved abrasion resistance wherein the treating composition further comprises a salt of lithium.

5. A method for producing a hardened, fluid impermeable surface on Portland cement as claimed in claim 1 wherein the treating composition further comprises an accelerator.

6. A method for producing a hardened, fluid impermeable surface on Portland cement as claimed in claim 1 wherein the treating composition further comprises a retarder.

7. A method for producing a hardened, fluid impermeable surface on Portland cement as claimed in claim 2 or 3 or 4 wherein the aluminous cement is one selected from the group consisting of high alumina cement, calcium aluminate cement and cement whose main cementitious consitituent comprises monocalcium aluminate, and the gypsum is one selected from the group consisting of calcium sulfate, calcium sulfate anhydrate, calcium sulfate hemihydrate, calcium sulfate dihydrate, plaster of Paris, calcined gypsum and pressure calcined gypsum.

8. A Portland cement structure having a hardened, fluid impermeable surface formed thereon comprising Portland cement and a coating integral therewith comprising the reaction products of unset Portland cement and dry composition comprising aluminous cement and gypsum.

9. A Portland cement structure having a hardened, fluid impermeable surface as claimed in claim 11 wherein the aluminous cement is one selected from the group consisting of high alumina cement, calcium aluminate cement and cement whose main cementitious constituent comprises monocalcium aluminate, and the gypsum is one selected from the group consisting of calcium sulfate, calcium sulfate anhydrate, calcium sulfate hemihydrate, calcium sulfate dihydrate, plaster of Paris and calcined gypsum.

* * * * *

UNITED STATES PATENT AND TRADEMARK OFFICE
CERTIFICATE OF CORRECTION

PATENT NO. : 4,366,209
DATED : December 28, 1982
INVENTOR(S) : Warner K. Babcock It is certified that error appears in the above—identified patent and that said Letters Patent is hereby corrected as shown below:

Abstract line 6, "pros-" should read -- pos- --.

Signed and Sealed this

Twenty-sixth Day of April 1983

[SEAL]

Attest:

GERALD J. MOSSINGHOFF

Attesting Officer | Commissioner of Patents and Trademarks